United States Patent
Rocklin

3,763,343
Oct. 2, 1973

[54] METAL TREATING TOOL
[76] Inventor: Isadore J. Rocklin, 3240 Douglas St., Sioux City, Iowa 51104
[22] Filed: July 13, 1972
[21] Appl. No.: 271,388

Related U.S. Application Data
[63] Continuation-in-part of Ser. No. 76,084, Sept. 28, 1970, abandoned.

[52] U.S. Cl.................. 219/76, 219/70, 219/96, 219/113
[51] Int. Cl.............................................. B23k 9/16
[58] Field of Search................ 219/76, 69 U, 113, 219/97, 77, 70, 95, 96; 148/12.9, 13.1

[56] References Cited
UNITED STATES PATENTS

| | | | |
|---|---|---|---|
| 3,614,373 | 10/1971 | Skilling | 219/69 U |
| 3,415,970 | 12/1968 | Cline | 219/76 X |
| 3,415,971 | 12/1968 | Shaffer | 219/76 |
| 3,406,324 | 10/1968 | Ayers | 219/113 X |
| 3,524,956 | 8/1970 | Rocklin | 219/76 |
| 3,015,019 | 12/1961 | Lane et al. | 219/113 X |
| 3,670,137 | 6/1972 | Inoue | 219/76 |

Primary Examiner—J. V. Truhe
Assistant Examiner—B. A. Reynolds
Attorney—Luke A. Mattare et al.

[57] ABSTRACT

A method for treating the surface of a workpiece involves vibrating a consumable electrode such as tungsten carbide toward and away from the surface while maintaining the electrode and workpiece connected across a capacative discharge circuit which is continuously supplied by a d.c. potential source. The d.c. open circuit voltage of the supply, the charging current for the capacative discharge circuit and the capacitance of the discharge circuit are controlled to prevent electrode consumption.

6 Claims, 5 Drawing Figures

INVENTOR
ISADORE J. ROCKLIN

BY Shoemaker and Mattare
ATTORNEYS

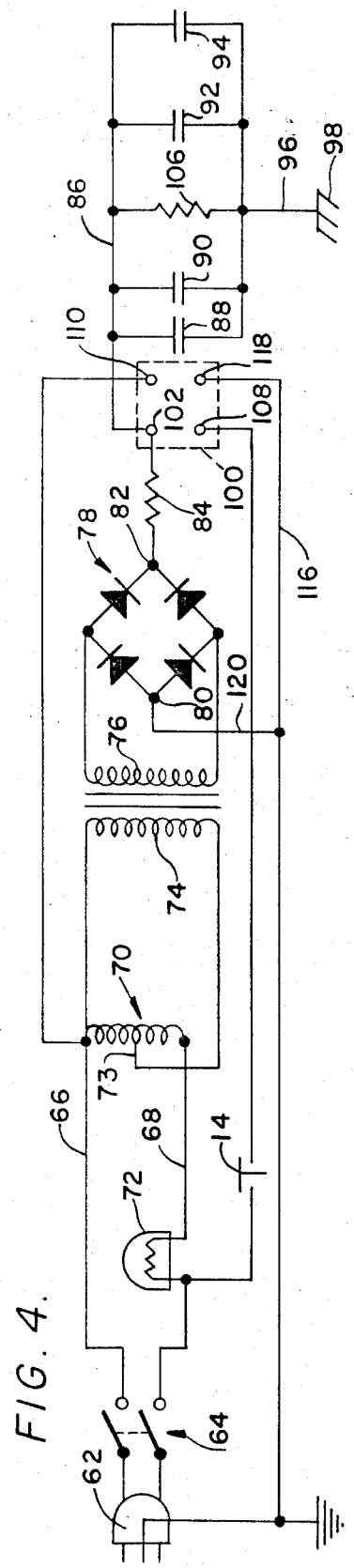
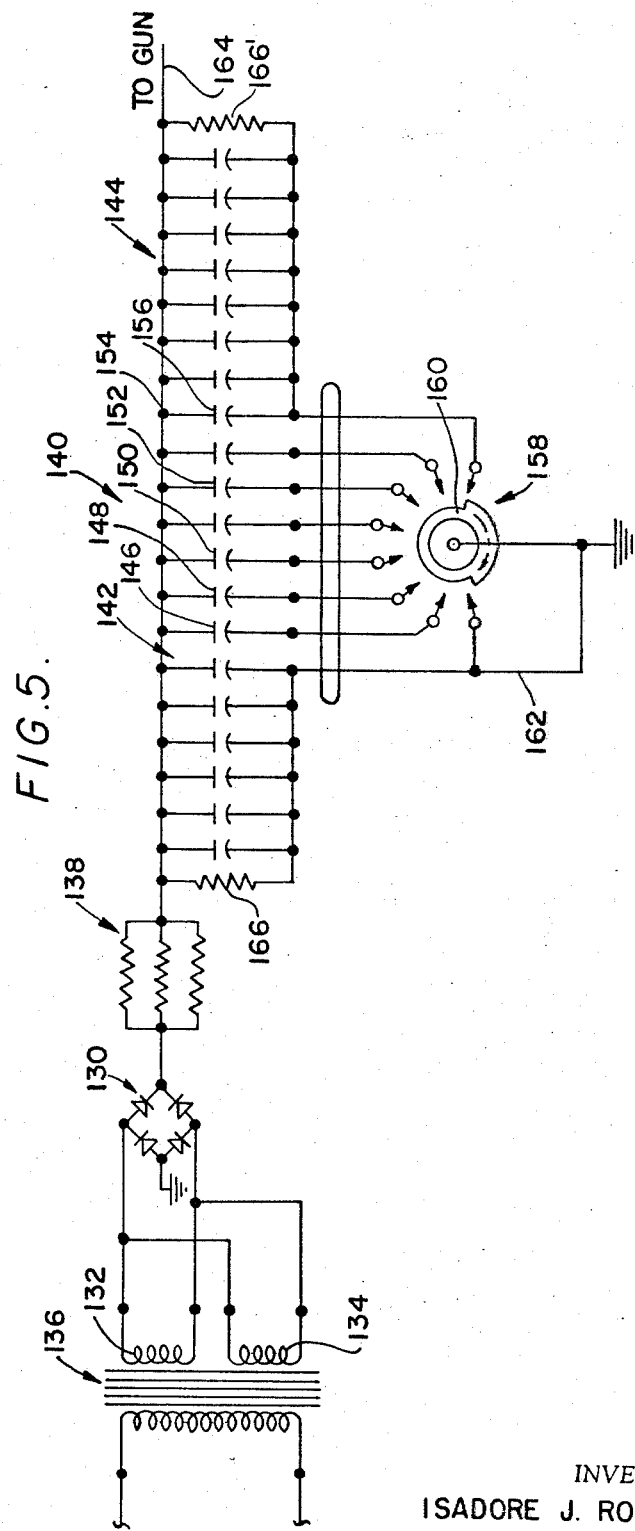
FIG. 4.
FIG. 5.
INVENTOR
ISADORE J. ROCKLIN
BY Shoemaker and Mattare
ATTORNEYS

METAL TREATING TOOL

CROSS REFERENCE TO RELATED APPLICATION

This application is a continuation-in-part of my copending application Ser. No. 76,084, filed Sept. 28, 1970, now abandoned.

BACKGROUND OF THE INVENTION

The present invention relates to the surface treatment of metals or metal workpieces or the like by means of treating the metal surface by the repeated application thereto of an electrode which draws an arc between the workpiece and the electrode. As distinguished from welding processes where the electrode is consumed, the present invention is not directed to consumption of the electrode except as it may occur insofar as infinitesimal deposition of the electrode material is concerned.

BRIEF SUMMARY OF THE INVENTION

The electrode according to the present invention is repeatedly applied to and withdrawn from the workpiece and an energy storage means is associated with the electrode repeatedly to draw an arc between the workpiece and the electrode, the circuit parameters of the system being chosen such that the electrode is not consumed to any appreciable extent but whereby the arc locally heats and melts the metal surface and ionizes the surrounding air and gaseous material whereas the surface material so melted is quickly quenched in air after the arc is extinguished. By maintaining the circuit parameters of the system according to the present invention within the open circuit voltage range of from about 25 to about 150 volts d.c., the output resistance within the range to provide about 2 to about 5 amperes available for charging the capacitor, and the capacitance within the range from about 5 microfarads to about 200 microfarads, a wide variety of surface treatment characteristics may be imparted to the workpiece.

BRIEF DESCRIPTION OF THE DRAWINGS

FIG. 4 is a circuit diagram illustrating one form of the invention; and,

FIG. 5 is another circuit diagram showing a modified form of the invention.

DETAILED DESCRIPTION OF THE INVENTION

Figure 1:
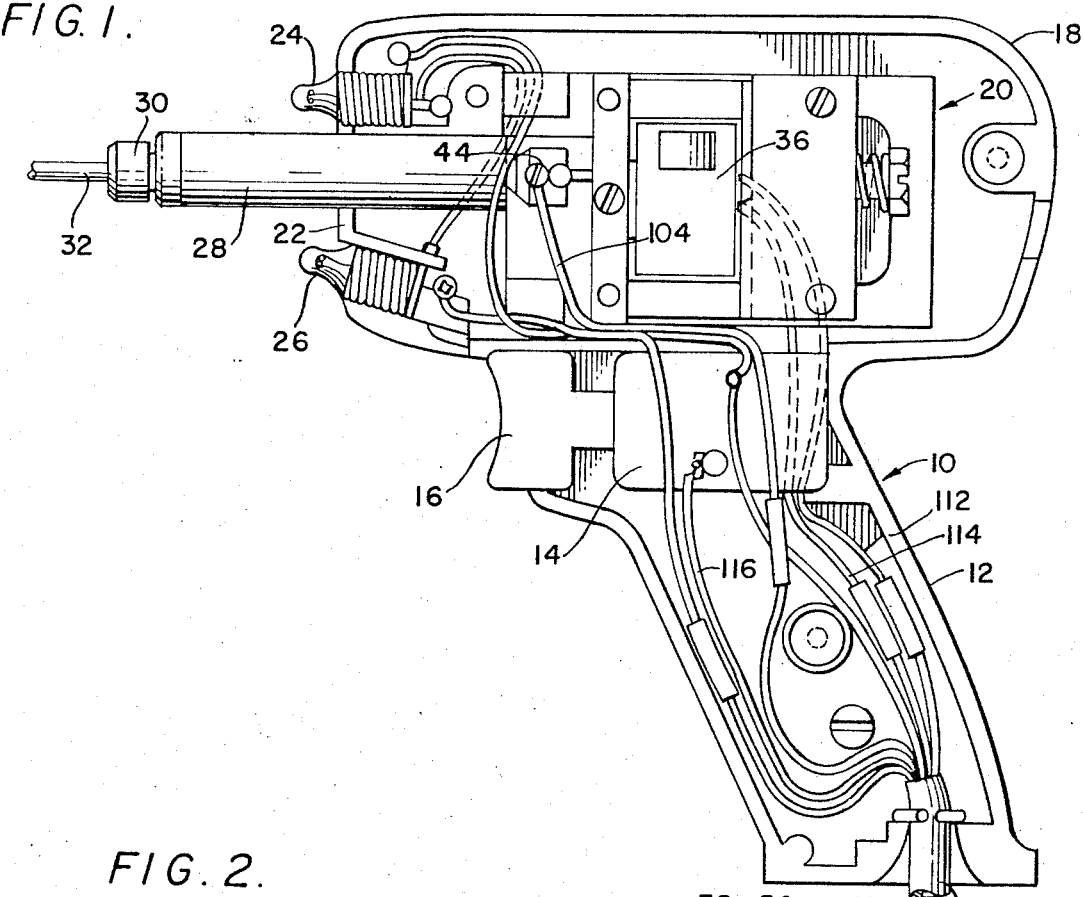
FIG. 1 is a view showing a tool according to the present invention in side elevation with one-half of its case removed and showing details of internal construction of the assembly.

Referring now more particularly to FIG. 1, the reference character 10 indicates in general one-half of a casing in one form of which the invention may be provided, the casing having a piston grip portion 12 and having a trigger switch 14 actuated by the push-button member 16 and with the casing including the upper portion 18 housing the electrode holder vibrator assembly 20 substantially as is shown. The forward end 22 of the casing mounts one or more illuminating bulbs 24 and 26 assuring that the workpiece being treated is well illuminated and an aperture at this end of the casing accomodates for the protruding guide 28 which houses a plunger carrying at one end a suitable chuck 30, which mounts the electrode 32 substantially as is shown.

Figure 2:
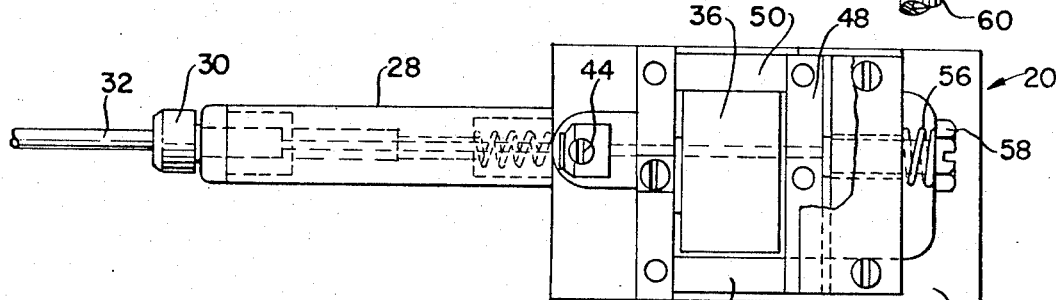
FIG. 2 is a top plan view of the internal portion of the components.
Figure 3:
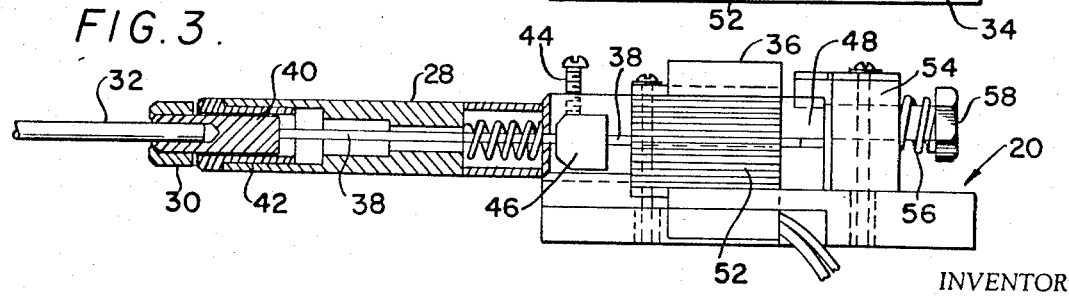
FIG. 3 is a side elevational view of the assembly shown in FIG. 2, portions being in section.

As is shown in FIGS. 2 and 3, the vibrator assembly includes a frame 34 which mounts a solenoid on one side thereof, the winding of the solenoid being indicated by the reference character 36. The armature 38 of the solenoid is extended as shown in FIG. 3 centrally within the guide 28 within which it is connected to the shank 40 of the chuck 30. Surrounding the shank 40 of the chuck 30 is a teflon or similar bushing 42 which serves not only to slidably mount the chuck for reciprocation, but which also electrically insulates same from the guide or nose 28. The capacitance discharge device is connected to the terminal screw 44 which relates the energy to the electrode 32. The collar 46 can be made of a material to insulate the capacitance discharge energy from the armature 38 by means of a fixed area of separation in the collar 46 of the electrode carrying element 40 from the armature 38. The inner end of the armature 38 is connected to a clapper 48 bridging across the pole pieces 50 and 52 of the laminated core of the solenoid and which is normally urged toward the block 54 under the action of the compression spring 56 bearing against the head 58 of the bolt engaged with the clapper 48. It will be appreciated that alternating current excitation of the solenoid winding 36 will effect rapid reciprocation of the armature 38 and consequently of the chuck 30 and the associated electrode 32.

The energizing circuit for the assembly shown in FIGS. 1-3 may take the form shown in FIG. 4 and normally will be contained in a separate component connected through suitable flexible conductor arrangements such as that indicated by the reference character 60 in FIG. 1. The circuit shown in FIG. 4 includes a plug 62 for connection of the circuitry to a suitable source of alternating current, and an off-on switch indicated generally by the reference character 64 is provided for selectively energizing the conductors 66 and 68 which are connected to an auto-transformer winding 70 as shown, there being a suitable fuse 72 for protective purposes. The moveable tap 73 of the auto-transformer winding 70 is connected to the transformer winding 74 which is inductively coupled to the transformer winding 76 having its output connected to the rectifying bridge circuit 78 having a grounded output terminal 80 and a positive terminal 82 connected, through the resistor 84 and the conductor 86 to a series of capacitors 88, 90, 92, and 94. These capacitors are arranged in parallel so that their capacitances are additive and they are commonly connected to a ground conductor 96 detachably connected as by an alligator clip to the workpiece symbolically indicated by the reference character 98.

The terminal device 100 includes the terminal 102 which is connected to the terminal member 44 of FIG. 1 by the conductor 104. Resistor 106 in FIG. 4 (166 FIG. 5) has the purpose to slowly leak off voltage applied to condensers to reduce the charge if not used in a short period of time. Resistor 84 properly limits the charge to the capacitors and to the electrode.

The switch 14 for energizing the solenoid winding 36 is shown in FIG. 4 and extends to the conductor terminal 108 of the device 100, the terminal 110 and the terminal 108 being connected through suitable conductors 112 and 114, see FIG. 1, to the winding 36 so that when the switch 14 is closed, the solenoid winding is energized as described hereinabove. For safety purposes, the frame or housing of the device shown in FIG. 1 is grounded by means of a conductor 116 which is connected to the terminal 118 of FIG. 4 which, as shown, serves also through the conductor 120 as the ground side for the rectifying bridge 78, the circuit being externally grounded through a suitable prong of the plug 62 diagrammatically illustrated.

It will be appreciated that vibration of the electrode 32 into and out of contact with the workpiece 98 diagrammatically shown in FIG. 4 will cause the energy stored in the capacitors 88, 90, 92 and 94 periodically to be discharged by arcing as the electrode approaches the workpiece and, when the arc is extinguished and the electrode is out of contact with the workpiece the condensers will be recharged across the d.c. source. For the treatment of metal working tools to surface harden them, the open circuit voltage is kept within the range of about 15 to about 150 d.c. volts, the output resistance is varied to maintain output currents generally within the 0.2 to 9 ampere range, while a capacitance may vary from about 1 microfarad to about 200 microfarad properly to effect release of the stored energy for attaining the requisite arcing effect.

Although the electrode is essentially non-consumable in operation, the surface when treated will display a build-up measurable by a suitable instrument such as a micrometer. By varying the parameters, the worked surface will display, progressively, a "blue tint," "discoloration" or "burn" condition as the parameters are varied. With the circuitry according to FIG. 4, allowing only 2.2 amperes output current, effective surface hardening results were achieved by surface deposits ranging up to 0.001 inches within the range of output current up to 2.4 amperes. At 3.4 amperes, discoloration and a deposit of 0.0011 inches was obtained; at 4.25 amperes, the "blue tint" with 0.0014 inches deposit was obtained; and at 5.2 amperes a "burn" condition was obtained with a deposit of 0.0016 inches. The useful workable discharge energy therefore determines the circuitry and values needed to obtain optimum results from the equipment.

To treat a tool properly, it is essential to determine the intended use of the tool and by means of regulating the energy output of the energy transfer device, the heat effected is controlled properly. The so-called "deposit" described hereinabove, occurs by reason of the results of each arc generated which actually melts an infinitely minute part of the tool surface and disturbs or disrupts this surface in essence to create a mound and a crater with each increment of electronic discharge. The rate of coverage of these manually governed strokes of the vibrating electrode as well as the dexterity of the operator also affect the relative finish or appearance of the treated surface. In general, however, within certain limits, the variance of the treated surface or the thickness of the deposit which can be accurately measured by a micrometer are achieved by means of electronic circuitry as follows:

1. at a fixed voltage output the amount of surface deposit varies with the amperage output and the capacitance utilized.
2. at a fixed amperage output the amount of surface deposit varies with the voltage output and the capacitance utilized
3. at a fixed capacitance, the amount of deposit varies with the voltage and amperage output There are, however, certain limiting restrictions, principally that if too much current is utilized the electrode become hot and loses its effectiveness and, if too much current is utilized, the surface of the treated tool either starts to turn blue, discolor, or the tool surface receives a burn which is detrimental to its proper use.

The circuitry according to FIG. 5 employs a full wave rectifier bridge 130 energized by the two secondary windings 132 and 134 of the transformer 136 which feeds, through the current limiting resistors 138, the energy storage assembly indicated generally by the reference character 140. The energy storage device includes two banks of parallel capacitors, indicated respectively by reference characters 142, 144 and as well, a plurality of individual capacitors 146, 148, 150, 152, 154, and 156, and a selector switch assembly 158 to selectively connect the capacitors into the circuitry.

As shown, the selector switch 158 includes a rotary member 160 which is grounded and as well, the bank 142 of capacitors is also permanently grounded, being connected by the conductor 162 to the ground connection for the rotary portion 160 of the switch. Thus, whenever the conductor 164 which is connected to the electrode, is likewise grounded by contact with the workpiece, the capacitors are short-circuited but as the electrode withdraws from the workpiece surface, at least the bank of capacitors 142 are leaked to ground by means of the resistor 166 as discussed, hereinabove. The bank of capacitors 144 may be similarly leaked to ground by resistor 166'. One or more of the capacitors 146–156 may be additionally charged by proper movement of the rotary portion 160 of the selector switch into electrical engagement with the associated contact of the selector switch so that the total capacitance of the energy storage means is thereby additively increased.

In this fashion, the system may be so controlled as to achieve the desired surface characteristics for the workpiece.

It will be understood that essentially no consumption of the electrode takes place during operation of the device and that the electrode may be selected from a wide range of materials. Preferably, tungsten carbide material is used for the body of the electrode.

Sintered metal of a powdered mixture was related in U.S. Pat. Nos. 1,998,609 Comstock; 2,731,711 Lucas; and others. Sintered metal of certain compounds comprising materials of hard surfaces has been extensively used as tools such as tungsten carbide metal cutting tools, or for extreme wear resistant surfaces. In some cases, new compacted powdered metal with various compounds have been proved superior to high speed steel, yet are not in the predominently tungsten carbide class so they could be classified as sintered tungsten carbide, titanium carbide, etc.

Yet, the drawback of a sintered metal is its integral process of manufacture. It is made of compressed powders of various mixtures and binders under extreme pressures and high temperatures to attempt to secure a homogenous material. Solidity of molecular structure of metallurgical homogeneity is not always the result. In a tool, powder particles at the surface when in use are subject to the extreme pressure and the interaction in the cutting process with other metals causes heat of friction such that the contacting surfaces receives the brunt of the wear service requirements. In time, the surface and sharpened tool edges break down and cause failure of cutting operations.

My invention also relates to the utilization of a spark hardening process applied to such sintered powder metals to weld-cement by metallurgical rearrangement and by molecular interchange and with arc generated heat from actually melting and rehardening the powder particles into a solid fused surface to receive the brunt of the surface contact relationship such as in cutting tool use for greater wear life.

My invention allows the coating of tungsten carbide sintered metal work tools to be weld surfaced, as well as, allows a coating of another further arcing process in which new combinations such as titanium can be applied and be merged with those present particles to give a further superior hardening to the established sintered hard surface for even greater wear life.

My invention provides a greater utilization of sintered powdered metals because of my invention which welds the surface and fused metal particles together. Such weld-cemented powdered metals are then in a position to stand up to potential surface fracture which the original metals without this process would break down.

My invention allows such materials as powdered metal cutting tools or other wear surfaces after treatment to give greater cutting characteristics and longer life between need for regrinding, or in the case of replacement tool bits—longer wear life. In addition, upon wear to cause the dullness of the cutting edge thereby needing resharpening, or replacement of the tool bits, my process allows resharpening by regrinding and the reapplication of my surface strengthening process by my simple spark discharge reapplication process.

I have found in my experiments hairline cracks of sintered tungsten carbide tools possibly created by the grinding process of sharpening could be so treated and the surface rebound into a solid surface by the application of a tungsten carbide electrode with this process of spark discharge. In this manner, the heat of the released arc power of the electrically generated spark melted the metal binder materials so as to fuse them around the tungsten carbide particles for surface restructure.

I have also found that by using titanium carbide electrodes when used in my arc created process and tools when applied to tungsten carbide, because titanium carbide has a higher melting point than tungsten carbide, I was able to coat the fused tungsten with titanium particles that in itself gave greater wear life than the original tungsten carbide.

In effect, with my process so utilized, I weld surfaced the powdered metal composite and/or sintered tungsten carbide, then created a coating of titanium over the basic applied tungsten carbide for even greater work results and capabilities.

Thus, as has been disclosed, the control of parameters is first made in such way that electrode consumption is not effected when the sintered metal first is provided with the fused surface. Thereafter, the controls are adjusted so as to effect some degree of titanium carbide electrode consumption and transfer onto this smooth surface.

As this invention may be embodied in several forms without departing from the spirit or essential characteristics thereof, the present embodiment is therefore illustrative and not restrictive.

What is claimed is:

1. A method of surface hardening a hard metal workpiece comprising the steps of:

providing an electric circuit including a transformer, connecting the transformer to a source of alternating electrical energy, connecting a full wave rectifier to the transformer, obtaining a positive output of direct current from the full wave rectifier, supplying the direct current to a resistance means and obtaining a limited direct current therefrom, supplying the limited direct current to a capacitor means, storing the electrical energy in the capacitor means, connecting a hard metal workpiece to one side of the capacitor means, connecting a hard metal electrode to the other side of said capacitor means to complete an electric circuit with the capacitor means, periodically discharging the stored electrical energy from the capacitor means to the electrode to ground in relationship to reciprocation of the electrode into and out of contact with the workpiece, the voltage, capacitance and amperage selected such that negligible consumption of the electrode occurs, supporting the electrode in a vibrating mechanism, using a source of electrical energy to rapidly reciprocate the electrode back and forth into and out of contact with the workpiece, the discharged electrical energy creating an electric arc between the electrode and workpiece, said arc melting the metal of the workpiece at the surface of the workpiece in the immediate area of the arc, and rapid quenching the melted metal of the workpiece to harden the surface metal of the workpiece.

2. A method as in claim 1, wherein the voltage is selected in the range of from about 25 to about 150 volts DC, the amperage for charging the capacitor means is selected in the range of from about 2 to 5 amperes, and the capacitance is selected in the range of from about 5 microfarads to about 200 microfarads.

3. A method as in claim 1, wherein the electrode is tungsten carbide, and the workpiece is tungsten carbide.

4. A method of coating the surface of a sintered, powdered metal workpiece to weld-cement the powder particles into a solid fused surface, comprising the steps of:

providing an electric circuit including a transformer, connecting the transformer to a source of alternating electrical energy, connecting a full wave rectifier to the transformer, obtaining a positive output of direct current from the full wave rectifier, supplying the direct current to a resistance means and obtaining a limited direct current therefrom, supplying the limited direct current to a capacitor means, storing the electrical energy in the capacitor means, connecting a sintered, powdered metal workpiece to one side of the capacitor means, connecting a titanium carbide electrode to the other side of said capacitor means to complete an electric circuit with the capacitor means, periodically discharging the stored electrical energy from the capacitor means to the electrode to ground in relationship to reciprocation of the electrode into and out of contact with the workpiece, the voltage, capacitance and amperage selected such that consumption of the electrode and deposit of titanium carbide onto the workpiece occurs, supporting the electrode in a vibrating mechanism, using a source of electrical energy to rapidly reciprocate the electrode back and forth into and out of contact with the workpiece, the discharged electrical energy creating an electric arc between the electrode and workpiece, said arc melting the metal of the workpiece at the surface of the workpiece in the immediate area of the arc to fuse the deposited titanium carbide to the metal of the workpiece, and rapid quenching the melted metal of the workpiece to harden the surface metal of the workpiece.

5. A method as in claim 4, wherein the voltage is selected in the range of from about 25 to about 150 volts DC, the amperage for charging the capacitor means is selected in the range of from about 2 to about 5 amperes, and the capacitance is selected in the range of from about 5 microfarads to about 200 microfarads.

6. A method as in claim 4, wherein the sintered, powdered metal workpiece comprises tungsten carbide.

* * * * *